(12) United States Patent
Sato (10) Patent No.: US 7,675,416 B2
(45) Date of Patent: Mar. 9, 2010

(54) INTRUDER DETECTION DEVICE

(75) Inventor: Yoshio Sato, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 515 days.

(21) Appl. No.: 11/516,568

(22) Filed: Sep. 7, 2006

(65) Prior Publication Data

US 2007/0152818 A1    Jul. 5, 2007

(30) Foreign Application Priority Data

Dec. 28, 2005    (JP)    ............................. 2005-378783

(51) Int. Cl.
　　*G08B 13/18*        (2006.01)
　　*G01R 31/00*        (2006.01)
(52) U.S. Cl. ........................................ 340/552; 702/59
(58) Field of Classification Search ................ 340/552, 340/541, 566, 572.4, 511, 539; 342/27; 702/59
See application file for complete search history.

(56) References Cited

U.S. PATENT DOCUMENTS

| | | | | |
|---|---|---|---|---|
| 4,887,069 A * | 12/1989 | Maki et al. | ................... | 340/552 |
| 5,914,655 A * | 6/1999 | Clifton et al. | ............... | 340/506 |
| 6,204,772 B1 * | 3/2001 | DeMay et al. | ........... | 340/686.1 |
| 6,252,507 B1 * | 6/2001 | Gagnon | ....................... | 340/552 |
| 6,271,754 B1 * | 8/2001 | Durtler | ....................... | 340/552 |
| 6,288,640 B1 * | 9/2001 | Gagnon | ................. | 340/539.17 |
| 6,424,259 B1 * | 7/2002 | Gagnon | ....................... | 340/554 |
| 6,577,236 B2 * | 6/2003 | Harman | ....................... | 340/552 |
| 6,664,894 B2 * | 12/2003 | Pakhomov | .................. | 340/541 |
| 7,019,648 B2 * | 3/2006 | Gagnon | ....................... | 340/552 |
| 7,069,160 B2 * | 6/2006 | Cecil | ........................... | 702/59 |

FOREIGN PATENT DOCUMENTS

| | | | |
|---|---|---|---|
| JP | 5-166074 | A | 7/1993 |
| JP | 9-172630 | A | 6/1997 |
| JP | 9-274077 | A | 10/1997 |
| JP | 10-095338 | A | 4/1998 |
| JP | 2004-306909 | A | 11/2004 |

* cited by examiner

*Primary Examiner*—Benjamin C Lee
*Assistant Examiner*—Sigmund Tang
(74) *Attorney, Agent, or Firm*—Buchanan Ingersoll & Rooney PC (57) ABSTRACT

The intruder detection device for deciding the occurrence of an invasion if an electric wave, which is received by a leakage transfer passage on the receiving side juxtaposed to a leakage transfer passage on the transmitting side for receiving a leakage electric wave from the transmitting leakage transfer passage, changes, and the intruder detection device comprises: a plurality of reference spectrum diffusion signal generating means; a plurality of correlating means configured together with the reference spectrum diffusion signal generating means on a common sensor card, for collating the output reference spectrum diffusion signal of the reference spectrum diffusion signal generating means with the received signal from the receiving leakage transfer passage; and setting means for adjusting the detection precision which is determined by the reference spectrum diffusion signal generating means and the correlating means.

14 Claims, 14 Drawing Sheets

PRIOR ART

INTRUDER DETECTION DEVICE

BACKGROUND OF THE INVENTION

1. Field of the Invention

This invention relates to an intruder detection device for deciding the occurrence of an invasion if an electric wave, which is received by a leakage transfer passage on the receiving side juxtaposed to a leakage transfer passage on the transmitting side for receiving a leakage electric wave from said transmitting leakage transfer passage, changes.

This intruder detection device is suitably used in case the presence/absence of an intruder and the position of invasion are detected over a relatively wide range such as in a factory, a substation, an airport or a parking zone.

2. Description of the Related Art

An intruder detection system of a related art employs a monitor camera, for example. In this system, for example, a plurality of monitor cameras are employed to detect the location of an intruder (as referred to JP-A-9-172630 (Patent Publication 1)).

In this intruder detection system for detecting the position of an intruder by using the plural monitor cameras, the detection range/time has to be set by changing the positions of the monitor cameras, the positions of images or the monitor camera themselves, thereby to raise problems of a poor precision for setting the detection range and a complicated setting method. In order to perform detections over a long distance and of a monitor area of a complicated structure and a wide shape, a number of monitor cameras are needed to mismatch a large-scale intruder detection system for detecting an intruder in the factory, substation or airport.

In recent years, on the other hand, an obstacle detection device, as described in JP-A-2004-306909 (Patent Publication 2), for example, is proposed as one of the intruder detection device which does not employ the plural monitor cameras.

Figure 14:
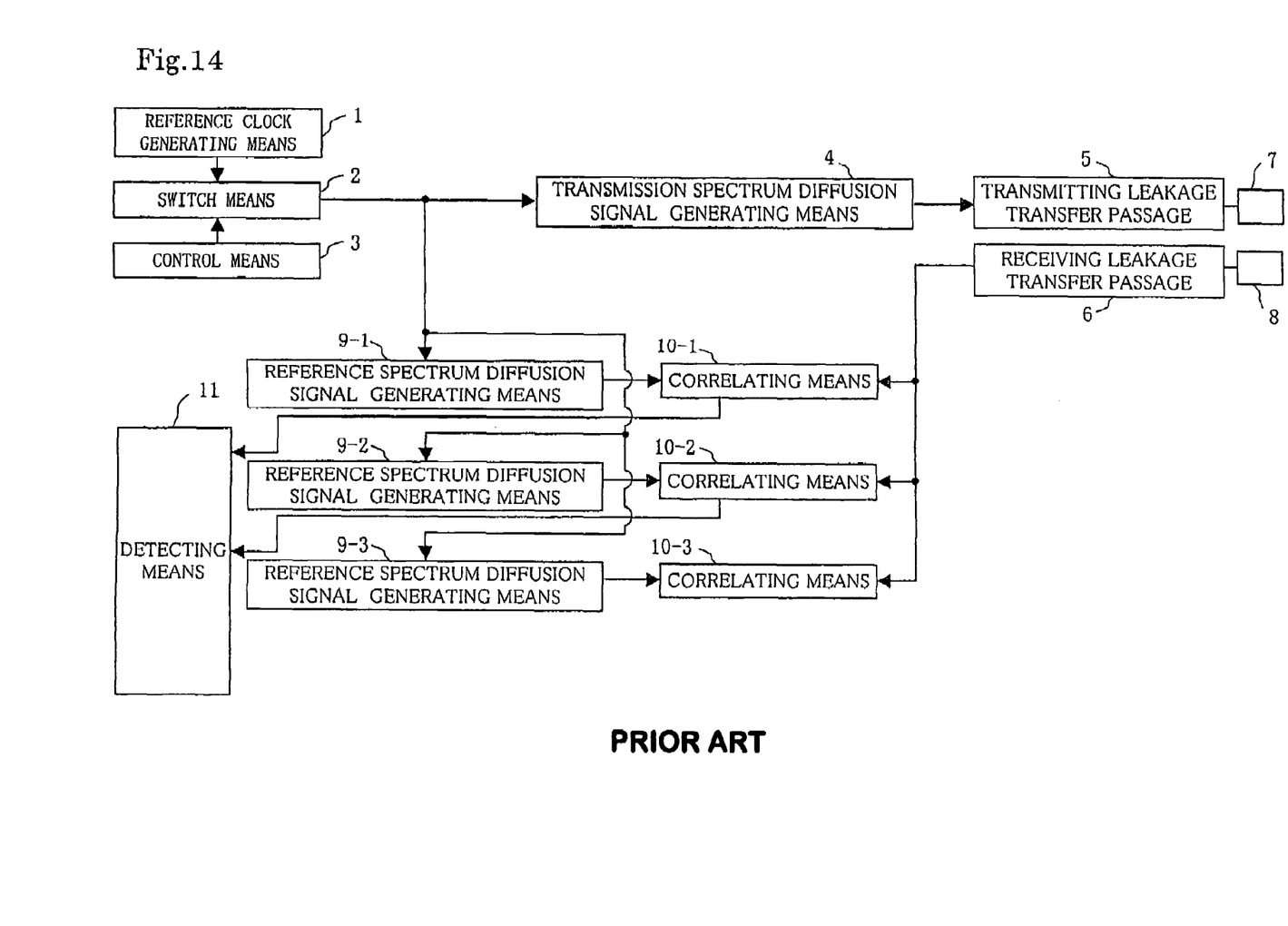
FIG. 14 is a block diagram showing a configuration of an obstacle detection device of the prior art.

FIG. 14 is a block diagram showing the configuration of the obstacle detection device of a related art, as described in Patent Publication 2, for example. In FIG. 14, three reference spectrum diffusion signal generating means 9-1 to 9-3 generate the reference diffusion codes of the delay times, which correspond to the obstacle measurement distances of 0 to 30 m and the detection precision of ±5 m, from a reference clock signal, and output reference spectrum diffusion signals which have been diffused and modulated with the reference diffusion codes. A plurality of correlating means 10-1 to 10-3 corresponding to the reference spectrum diffusion signal generating means 9-1 to 9-3 correlate the transmitted spectrum diffusion signals received by a receiving leakage transfer passage 6 and the reference spectrum diffusion signals, and output a correlation signal when their phases are identical. When the fluctuations of the signal level of the correlation signal from the individual delay times are at a set value or more, detection means 11 detects that an obstacle has invaded into the side.

Figure 15:
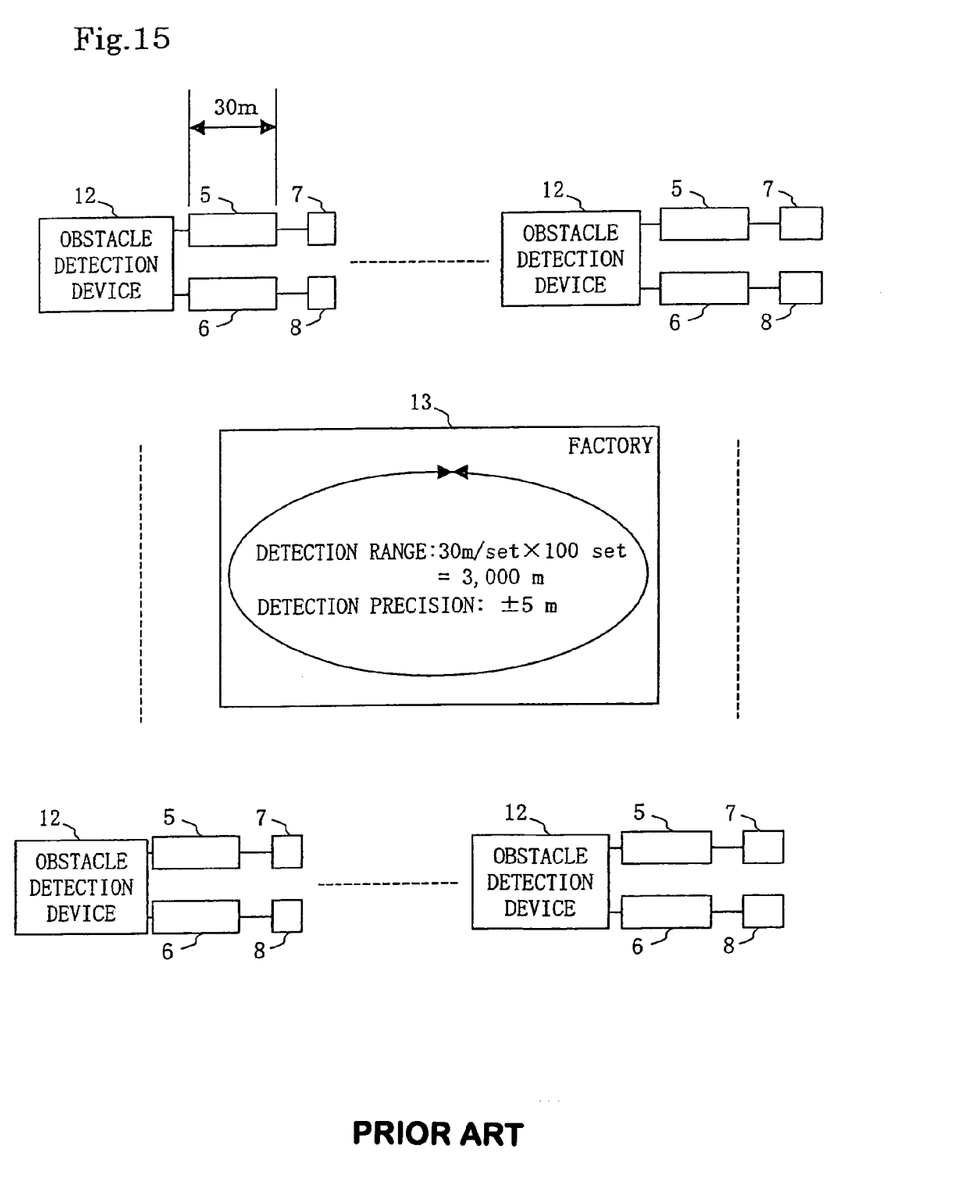
FIG. 15 is a diagram showing an example of supposed installation of the obstacle detection device of the prior art.

On the other hand, FIG. 15 is a diagram showing the number of obstacle detection devices 12 of the prior art installed supposing the case, in which the obstacle detection devices 12 described in Patent Publication 2 are made to cover the surrounding of 3,000 m of a factory 13 needed by the customer. In FIG. 15, one obstacle detection device 12 has a detection range of 30 m, so that one hundred obstacle detection devices 12 are used for the case of the detection range of 3,000 m.

[Patent Publication 1]
JP-A-9-172630 (FIG. 1 and its Description)

[Patent Publication 2]
JP-A-2004-306909 (FIG. 1 and its Description)

Since the obstacle detection device of the related art, as disclosed in Patent Publication 2, is configured, as described above, a plurality of obstacle detection devices have to be installed in case the detection range is enlarged. In case a plurality of correlating means are to be mounted on one obstacle detection device, there arises problems against commercialization, such as a complicated ratio H/W or an easy susceptibleness to influences of heat liberation or noises thereby to make it difficult to improve the detection precision.

SUMMARY OF THE INVENTION

This invention has been conceived in view of the background thus far described, and has an object to provide an intruder detection device which can be extended in a detection range and improved in a detection precision and which can be easily commercialized in an economical aspect.

According to an aspect of the invention, there is provided an intruder detection device for deciding the occurrence of an invasion if an electric wave, which is received by a leakage transfer passage on the receiving side juxtaposed to a leakage transfer passage on the transmitting side for receiving a leakage electric wave from said transmitting leakage transfer passage, changes. The intruder detection device comprises: a plurality of reference spectrum diffusion signal generating means; a plurality of correlating means configured together with said reference spectrum diffusion signal generating means on a common sensor card, for collating the output reference spectrum diffusion signal of said reference spectrum diffusion signal generating means with the received signal from the receiving leakage transfer passage; and setting means for adjusting the detection precision which is determined by said reference spectrum diffusion signal generating means and said correlating means. Thus, the invasion position of an intruder is detected from the individual outputs of said plural correlating means.

DESCRIPTION OF THE PREFERRED EMBODIMENTS

Embodiment 1

Figure 1:
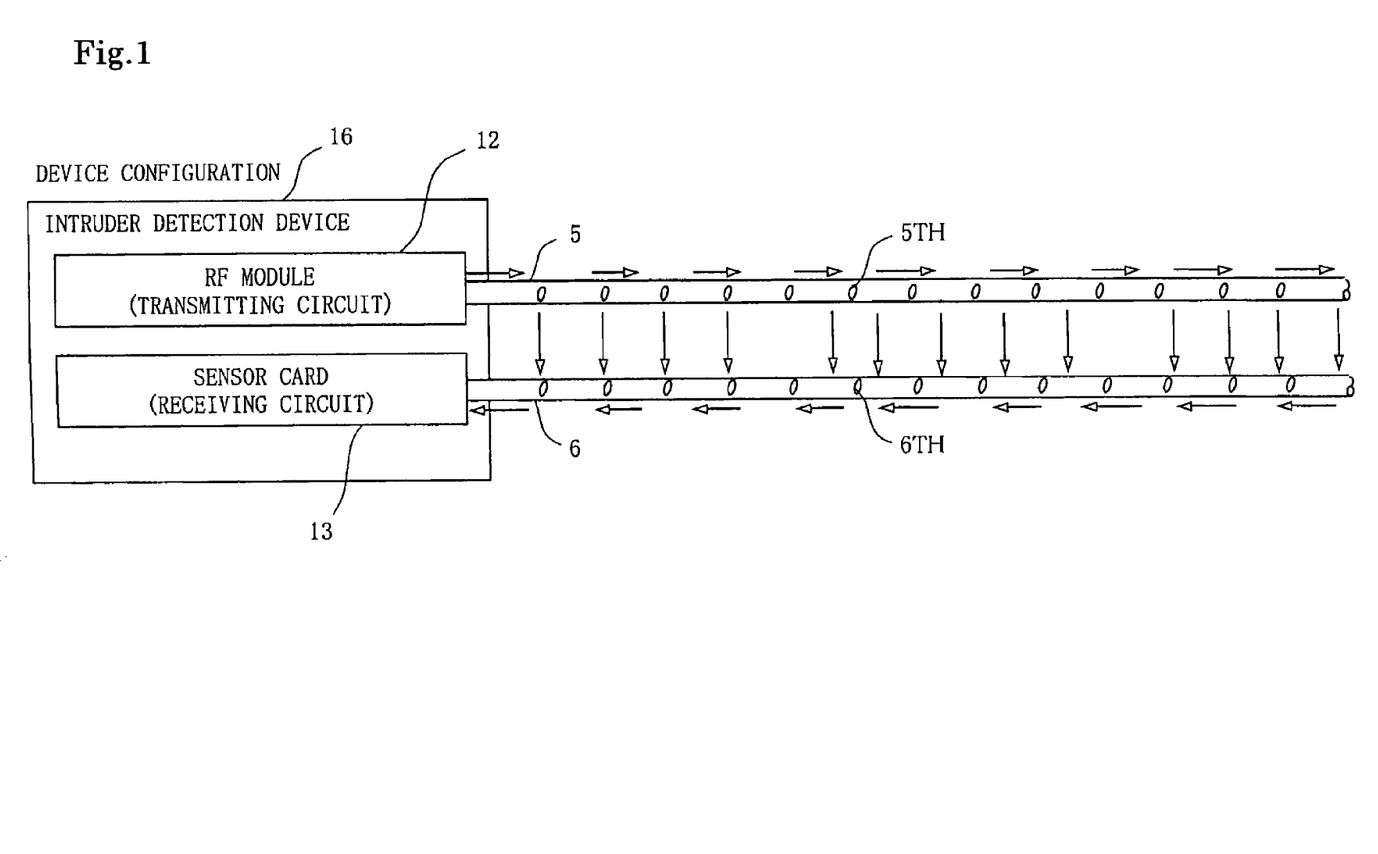
FIG. 1 is a diagram showing Embodiment 1 of this invention, i.e., an example of a schematic configuration of an intruder detecting system.
Figure 2:
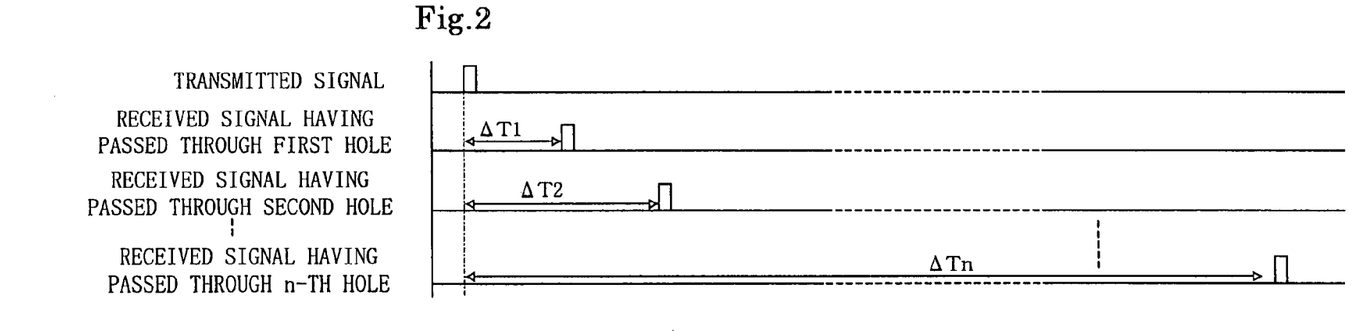
FIG. 2 is a diagram showing Embodiment 1 of this invention, i.e., one example of a detecting concept of an invasion position.
Figure 3:
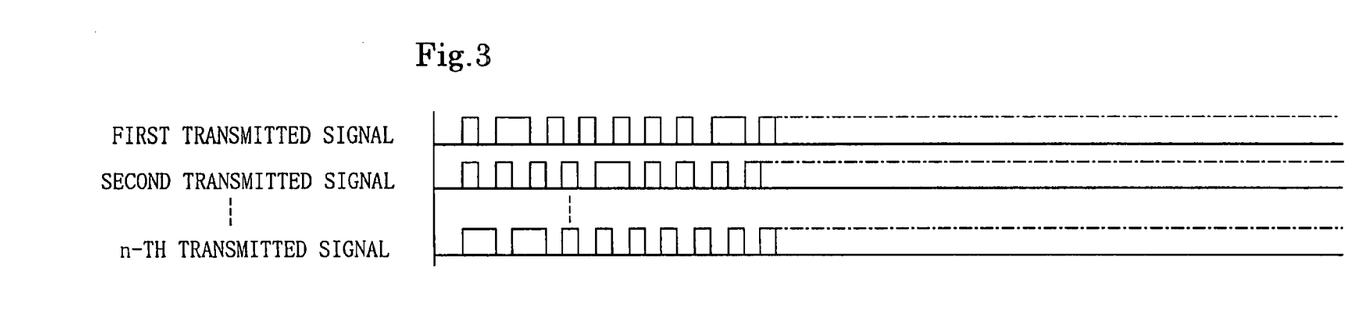
FIG. 3 is a diagram showing Embodiment 1 of this invention, i.e., a specific example of a transmission signal.
Figure 4:
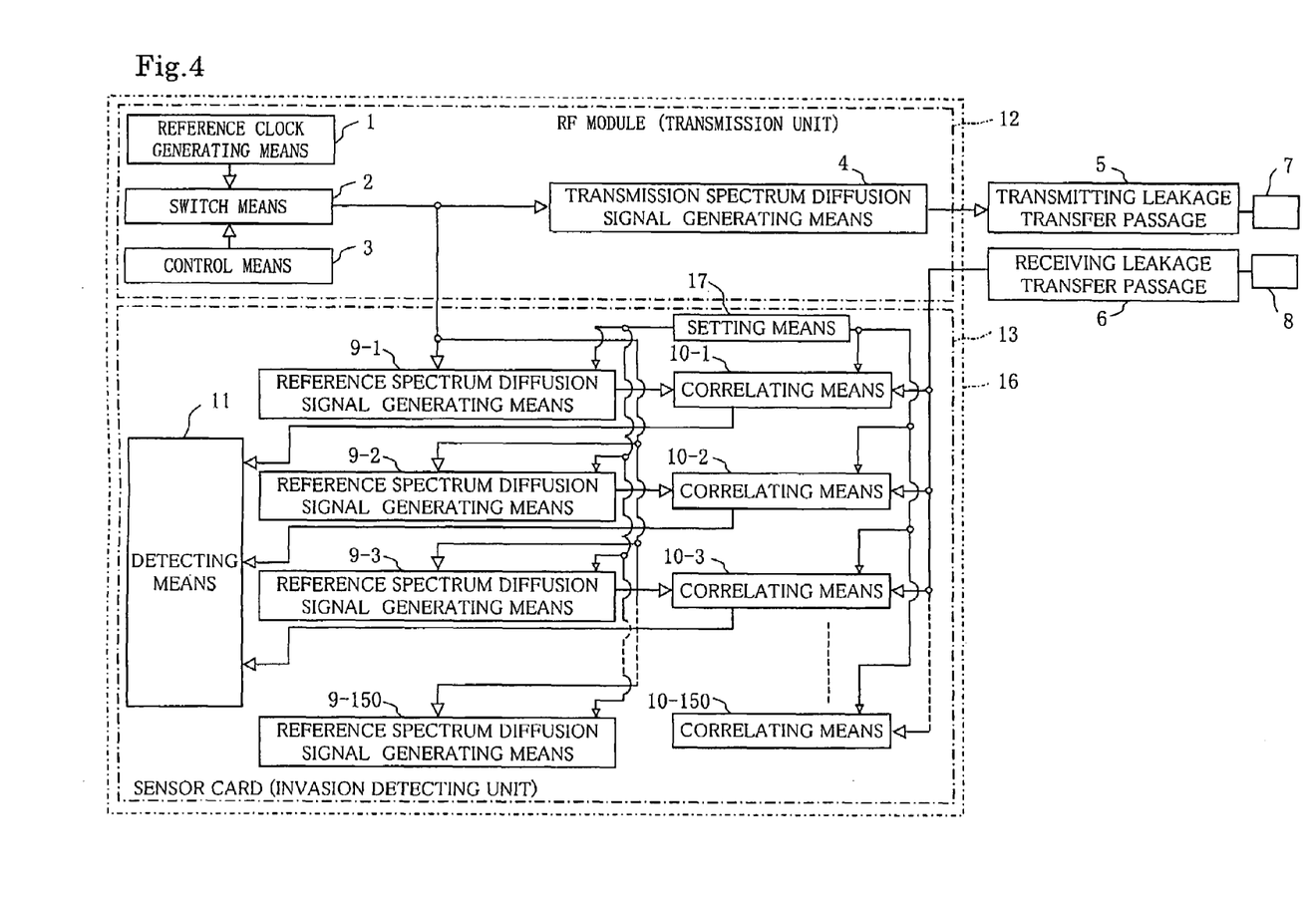
FIG. 4 is a block diagram showing Embodiment 1 of this invention, i.e., an internal configuration of an intruder detection device.
Figure 5:
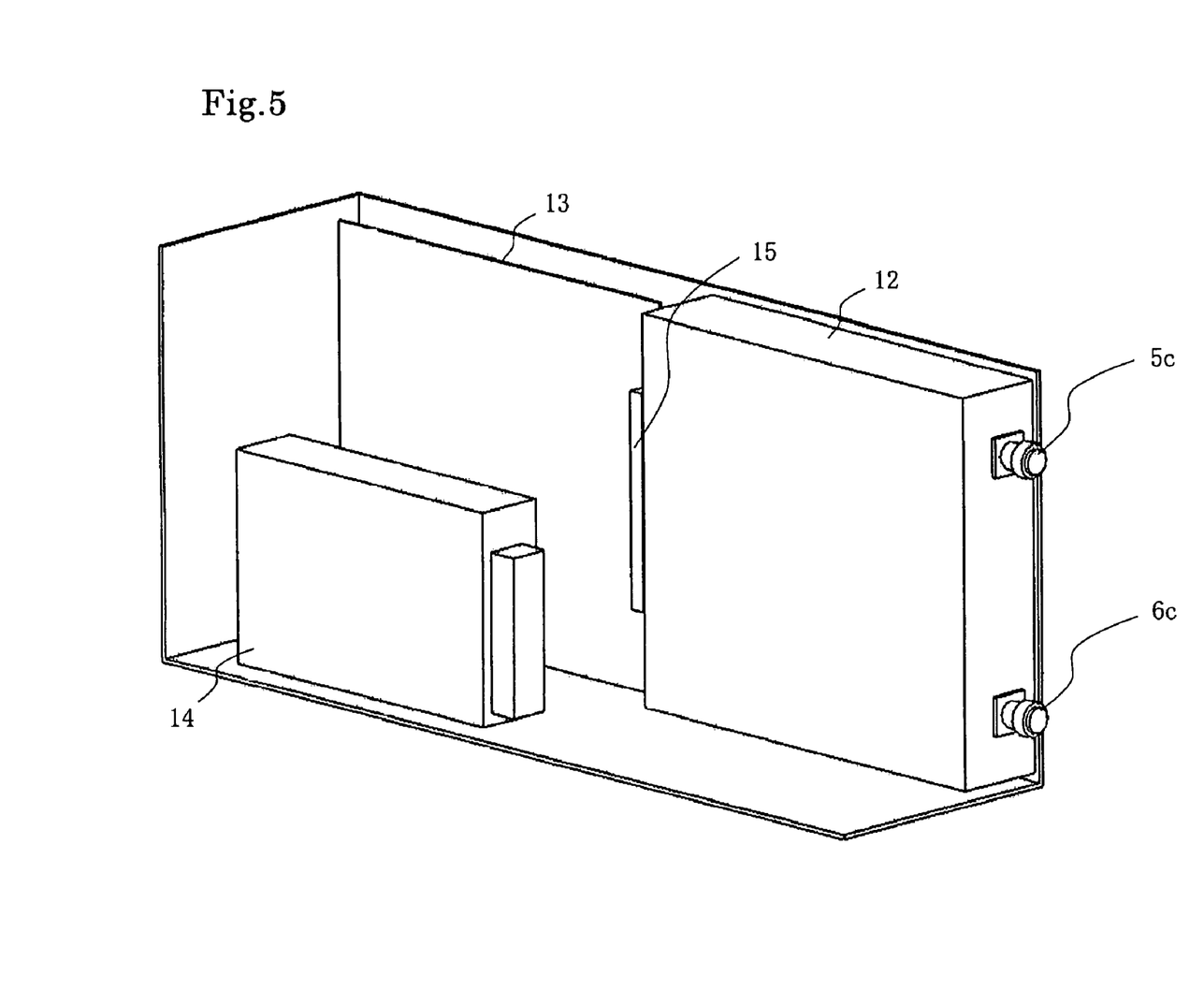
FIG. 5 is a perspective view showing Embodiment 1 of this invention, i.e., an essential portion of the intruder detection device.
Figure 6:
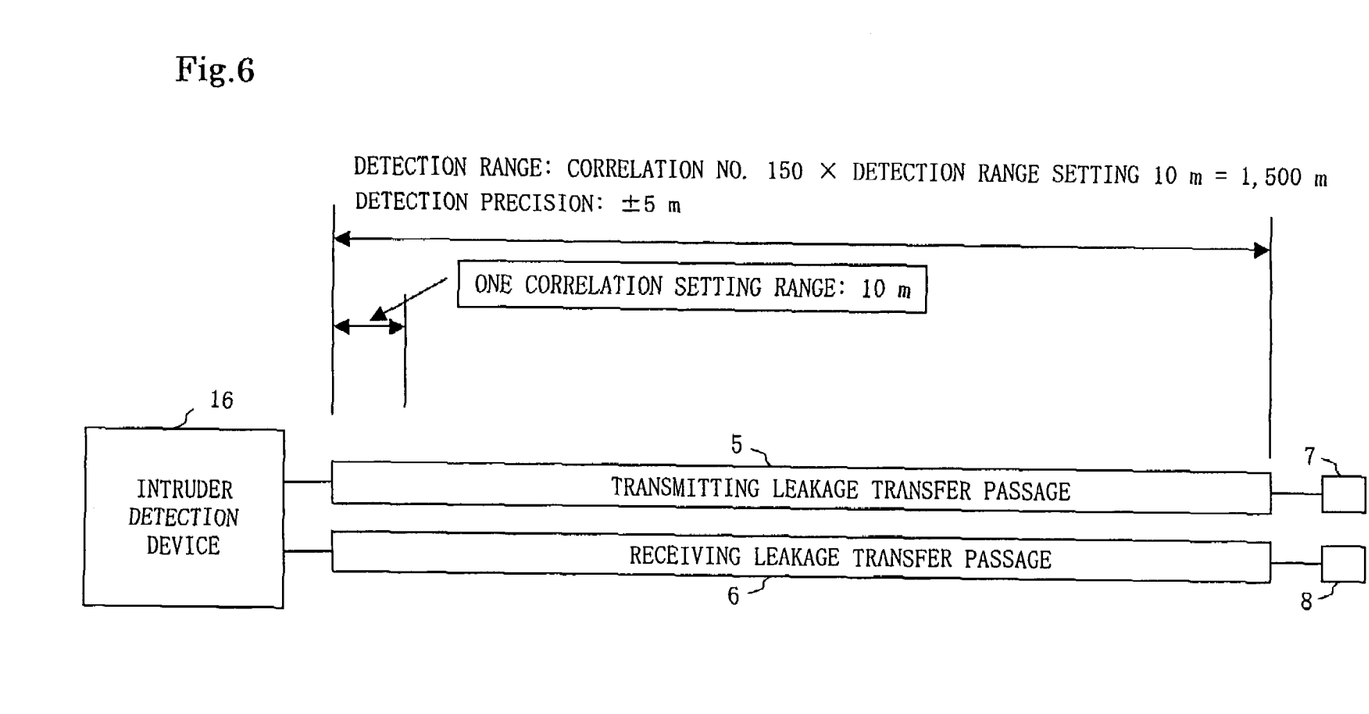
FIG. 6 is a diagram showing Embodiment 2 of this invention, i.e., an example of the installation for commercialization.

Embodiment 1 of the invention is described in the following with reference to FIG. 1 to FIG. 6. FIG. 1 is a diagram showing an example of a schematic configuration of the intruder detecting system; FIG. 2 is a diagram showing one example of a detecting concept of an invasion position; FIG. 3 is a diagram showing a specific example of a transmission signal; FIG. 4 is a block diagram showing an internal configuration of an intruder detection device; FIG. 5 is a perspective view showing an essential portion of the intruder detection device; and FIG. 6 is a diagram showing an example of the installation for commercialization.

FIG. 1 shows the intruder detecting system. In this intruder detecting system, a leakage transfer passage 5 on the transmitting side and a leakage transfer passage 6 on the receiving side juxtaposed to the transmitting leakage transfer passage 5 for receiving a leakage electric wave from the transmitting leakage transfer passage 5 are connected with an intruder detection device 16 so that the intruder detecting system detects the occurrence of an invasion if the electric wave received by the receiving leakage transfer passage 6 changes. The transmitting leakage transfer passage 5 and the receiving leakage transfer passage 6 are equipped with pluralities of leakage portions 5TH, 5TH, 5TH, - - - , and so on and 6TH, 6TH, 6TH, - - - , and so on, which are scattered in the extending direction of those leakage transfer passages. The intruder detecting system has an invasion position detecting function to detect the position of invasion of the intruder from the states of such individual signals received by an RF module 12 acting as a receiving side on the receiving side as are generated by leakage electric waves at the individual leakage portions at the individual 5TH, 5TH, 5TH, - - - , and so on and 6TH, 6TH, 6TH, - - - , and so on.

The transmitting leakage transfer passage 5 and the receiving leakage transfer passage 6 to be employed are exemplified by commercially available coaxial cables. The leakage portions 5TH, 5TH, 5TH, - - - , and so on and 6TH, 6TH, 6TH, - - - , and so on of the transmitting leakage transfer passage 5 and the receiving leakage transfer passage 6 are the through slots which are formed at an interval of several meters in the commercially available leakage coaxial cable.

Here is explained one example of the concept of detecting the invasion position.

The commercially available leakage coaxial cables are used as the transmitting leakage transfer passage 5 and the receiving leakage transfer passage 6, and are laid at the interval of several meters therebetween. In case one transmission pulse is transmitted from the RF module 12 or the transmitting circuit, for example, as shown in FIG. 2, the leakage electric wave from first the hole (or the through slot) of the transmitting leakage transfer passage 5 is received through the first hole (or the through slot) of the receiving leakage transfer passage 6 so that it arrives as the received signal at a sensor card 13 acting as the receiving circuit. This arrival occurs at $\Delta T1$ after the transmission of the transmitted signal.

Likewise in case one pulse is transmitted from the RF module 12 acting as the transmitting circuit, the leakage electric wave from the second hole of the transmitting leakage transfer passage 5 is received through the second hole of the receiving leakage transfer passage 6 so that it arrives as the received signal at a sensor card 13 acting as the receiving circuit. This arrival occurs at $\Delta T2$ after the transmission of the transmitted signal.

Likewise, the arrival of the received signal through the third hole occurs at $\Delta T3$ after the transmission of the transmitted signal.

Moreover, these $\Delta T1$, $\Delta T2$ and $\Delta T3$, that is, the arrival time (or the delay time) $\Delta T$ can be easily calculated, if the length of the signal transmission passage is known, because the signal has a propagation velocity of 300,000 Km/sec.

In the sensor card 13 acting as the receiving circuit, therefore, the data of the arrival time (or the delay time) $\Delta T$ calculated in advance from the system configuration is stored. Then, the received signal can be discriminated on what hole (or through slot) it has passed through, if the actual received signal is collated with that stored data.

In case a person invades into the existing zone of the leakage electric wave, the leakage electric wave is changed in shape by the intruder.

Therefore, what position has been invaded along the transmitting leakage transfer passage 5 and the receiving leakage transfer passage 6 can be detected and notified, if the change in the signal received by the sensor card 13 or the receiving circuit is detected.

Here, because of an extremely high signal velocity and in relation to the detecting action speed of the receiving circuit, the signal is not transmitted by transmitting a single pulse once several seconds. The detection precision can be raised by using the spectrum diffusion signal called the PN signal, as exemplified in FIG. 3, such as a coded signal composed of several ten thousands of random pulses. It is arbitrary to transmit identical PN codes repeatedly or to transmit different PN codes sequentially. The PN codes per se are the generally known codes.

In case the PN codes are employed in the intruder detecting system exemplified in FIG. 1, the intruder detection device 16 modulates the phases of a high-frequency carrier wave with the output of the RF module 12 acting as the transmitting circuit to generate the spectrum diffusion signal, and outputs the modulated carrier wave to the transmitting leakage transfer passage 5. The electric wave outputted from the transmitting leakage transfer passage 5 is received through the leakage portions by the receiving leakage transfer passage 6 and further by the sensor card 13 acting as the receiving circuit. In this sensor card 13, the received wave is phase-operated with the reference spectrum diffusion codes related to an invasion distance, so that the intruder detection corresponding to the invasion distance is made with a change in the field intensity.

It has been known by our test and investigations that the intruder detecting system, in which the transmitting leakage transfer passage 5 and the receiving leakage transfer passage 6 juxtaposed to the transmitting leakage transfer passage 5 for receiving the leakage electric wave from the transmitting leakage transfer passage 5 are connected with the intruder detection device 16 and which detects the occurrence of the invasion if the electric wave received by the receiving leakage transfer passage 6 changes, is enabled to detect the occurrence of invasion or not and the position of invasion of a person between the leakage transfer passages 5 and 6 over a range as long as 1,500 to 3,000 m by laying the leakage transfer passages 5 and 6 over 1,500 to 3,000 m.

In FIG. 4, the RF module 12 includes reference clock generating means 1, switch means 2, control means 3, and transmission spectrum diffusion signal generating means 4. The sensor card 13 includes detecting means 11, reference spectrum diffusion signal generating means 9-1 to 9-150 and correlating means 10-1 to 10-150, and can have a detection range of a distance of 3,000 m, for example, in a precision of 20 m. The transmitting leakage transfer passage 5 transmits the transmitting spectrum diffusion signal. A transmitting terminator 7 prevents an error from being caused by the reflection of the transmitting spectrum diffusion signal. The receiving leakage transfer passage 6 receives and transfers the transmitting spectrum diffusion signal. A receiving terminator 8 prevents an error from being caused by the reflection of the transmitting spectrum diffusion signal received.

In FIG. 4, the RF module 12 includes the reference clock generating means 1, the switch means 2, control means 3, and the transmission spectrum diffusion signal generating means 4. The sensor card 13 includes the detecting means 11, the reference spectrum diffusion signal generating means 9-1 to 9-150 and the correlating means 10-1 to 10-150, and can have the detection range of the distance of 3,000 m, for example, in the precision of 20 m. The sensor card 13 further includes setting means 17, which has functions to stop the functions of the individual reference spectrum diffusion signal generating means individually and to stop the functions of the individual correlating means individually. The transmitting leakage transfer passage 5 transmits the transmitting spectrum diffusion signal. The transmitting terminator 7 prevents the error from being caused by the reflection of the transmitting spectrum diffusion signal. The receiving leakage transfer passage 6 receives and transfers the transmitting spectrum diffusion signal. The receiving terminator 8 prevents the error from being caused by the reflection of the transmitting spectrum diffusion signal received.

In FIG. 5, the intruder detection device 16, as also called the obstacle detection device, includes the RF module 12, the sensor card 13 and a power source device 14.

Actions are described in the following.

The sensor card 13 is set with the delay times corresponding at a measurement distance of 10 m (±5 m) to the one hundred and fifty reference spectrum diffusion signal generating means 9-1 to 9-150 mounted in a gate array for outputting the diffusion codes. Moreover, one hundred and fifty correlating means 10-1 to 10-150 corresponding to the reference spectrum diffusion signal generating means 9-1 to 9-150 are mounted. Still moreover, the sensor card 13 and the RF module 12 are so mounted in a common plane as to avoid mutual interference of noises and are connected by a right angle type connector 15 of an impedance of 50 Ω.

The RF module 12 is improved in insulation by covering it with an aluminum casing so as to improve the noise-resistance and by connecting it while exposing only the right-angle type connector 15 of an impedance of 50 Ω as an I/F connector to the sensor card 13.

The power supply device 14 is mounted sideway of the sensor card 13 away from the RF module 12 because it is a noise generating source.

As a result, the plural reference spectrum diffusion signal generating means 9-1 to 9-150 generates the reference diffusion codes of the delay time, which correspond at the measurement distance of 10 m (±5 m) of the intruder, from the reference clock generating means 1, and outputs the reference spectrum diffusion signals diffusion-modulated with the reference diffusion codes. The one hundred and fifty correlating means 10-1 to 10-150 corresponding to the reference spectrum diffusion signal generating means 9-1 to 9-150 correlate the transmitted spectrum diffusion signal received by the receiving leakage transfer passage 6 and the reference spectrum diffusion signal, and outputs a correlation signal when the phases are coincident. When the fluctuation of the signal level of the correlation signal to each of the intrinsic delay times set at the reference spectrum diffusion signal generating means 9-1 to 9-150, the detecting means 11 detects that the intruder exists at the place in the side of a factory or a railway line at an interval of 10 m (±5 m).

Here in Embodiment 1, the one hundred and fifty reference spectrum diffusion signal generating means 9-1 to 9-150, which are set with the corresponding delay times at the interval of the measurement distance of 10 m (±5 m), are mounted, and the one hundred and fifty corresponding correlating means 10-1 to 10-150 are mounted. The single intruder detection device can set the detection range to the correlation No. 150× the detection range of 10 m (±5 m)=1,500 m while keeping the detection precision of ±5 m, as shown in FIG. 6, thereby to provide the economically excellent intruder detection device 16 of a wide range.

Embodiment 2

Figure 7:
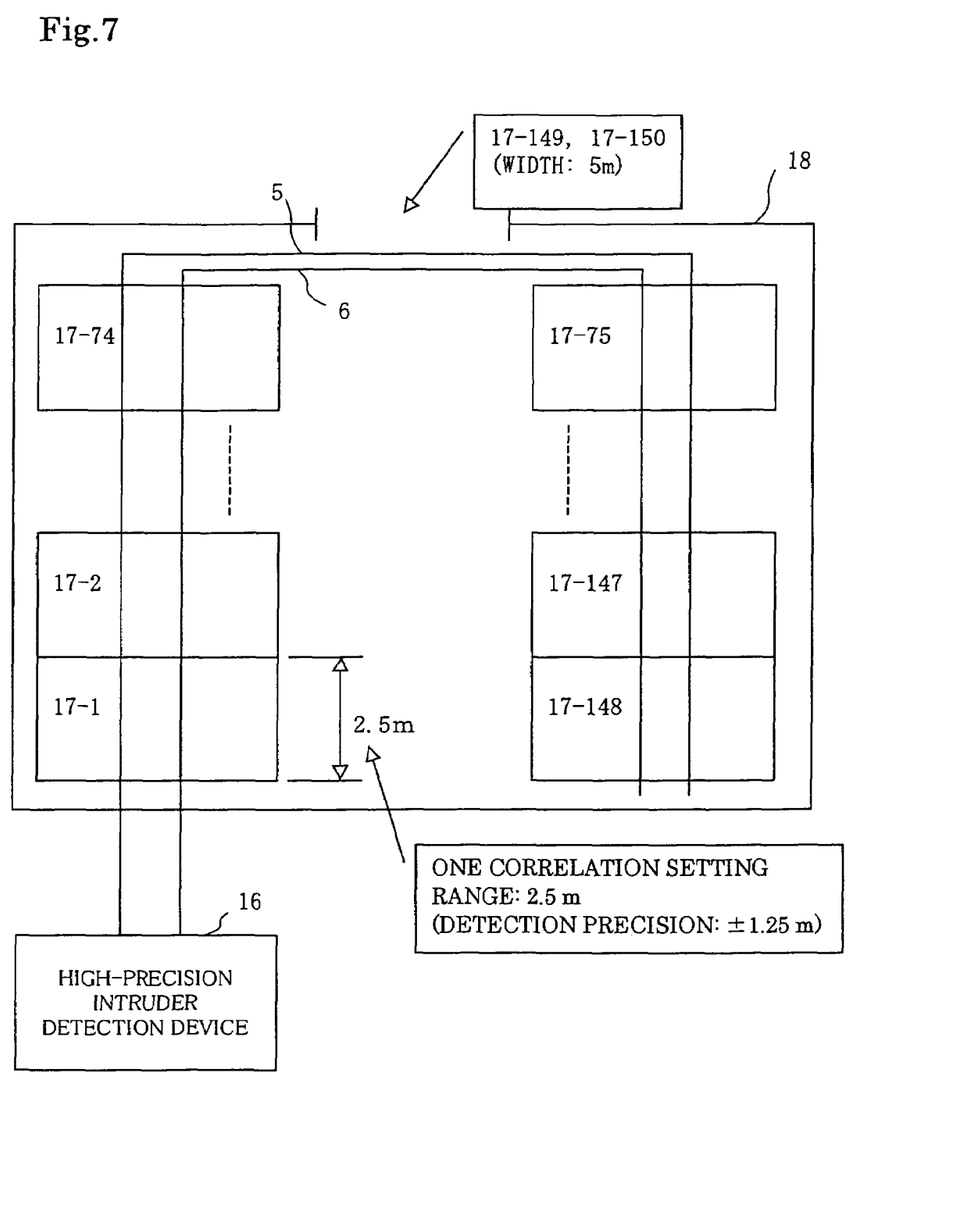
FIG. 7 is a diagram showing Embodiment 2 of this invention, i.e., an example of the installation for commercialization.

Here, Embodiment 1 has been described on the case, in which the one hundred and fifty reference spectrum diffusion signal generating means 9-1 to 9-150 and correlating means 10-1 to 10-150 are individually mounted to match the interval of the measurement distance of 10 m (±5 m) so that the detection range of 1,500 m and the detection precision of ±5 m can be realized by the single economically excellent intruder detection device of the wide range. However, in the case of a parking zone 18 having a plurality of parking spaces 17-1 to 17-150, as shown in FIG. 7, the measurement distance of 10 m (±5 m) makes it impossible to discriminate an automobile to be parked next so that the detection precision has to be divided finer. Therefore, the intruder detection device 16 is installed and set to correspond at the interval of a measurement distance of 2.5 m (±1.25 m) so that the parking positions of the parking spaces 17-1 to 17-148 and the number of automobiles through entrances/exits 17-149 and 17-150 can be detected.

Embodiment 3

Figure 8:
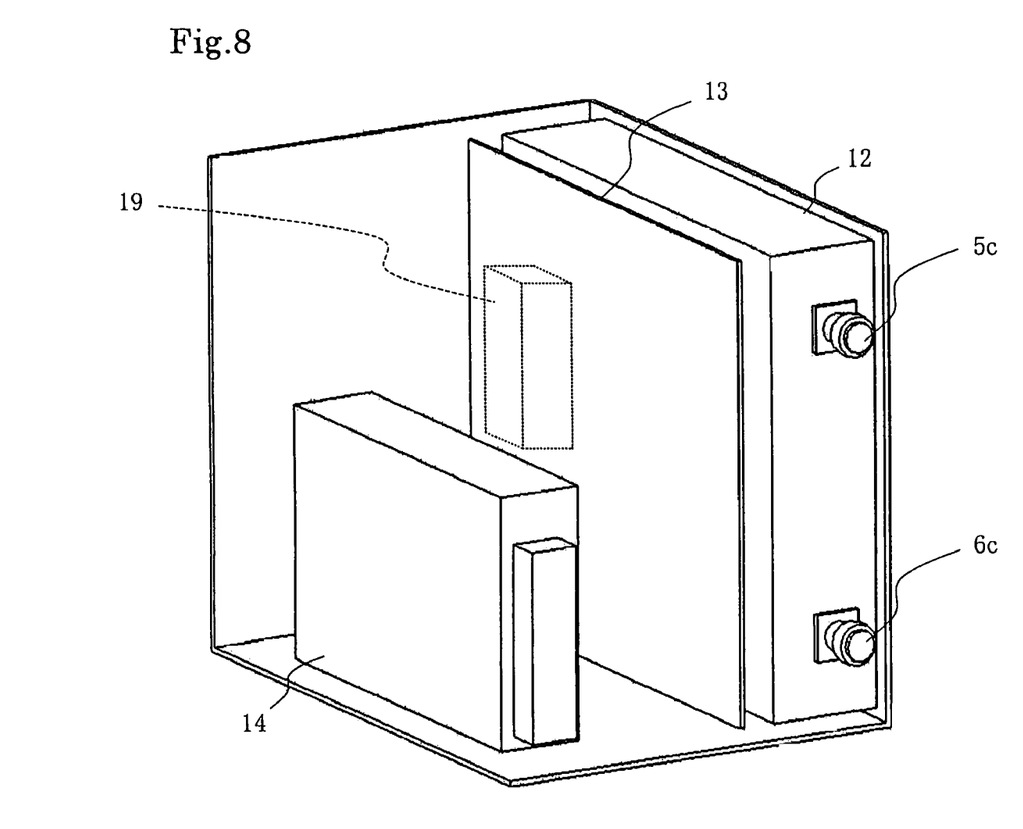
FIG. 8 is a perspective view showing Embodiment 3, i.e., an essential portion of the intruder detection device.

Here, Embodiment 1 has been described on the case, in which the one hundred and fifty reference spectrum diffusion signal generating means 9-1 to 9-150 and correlating means 10-1 to 10-150 are individually mounted to match the interval of the measurement distance of 10 m (±5 m) so that the detection range of 1,500 m and the detection precision of ±5 m can be realized by the single economically excellent intruder detection device of the wide range. In the arrangement of FIG. 5, however, the device itself requires a size of some extent. In the case of reducing the place for the intruder detection device, as needed by the customer, a straight type connector 19 of an impedance of 50 Ω is disposed in the upper portion and on the side of the RF module 12, as shown in FIG. 8, and is mounted and connected on the back of the sensor card 13. Thus, it is possible to provide a reduced economically excellent intruder detection device.

Embodiment 4

Figure 9:
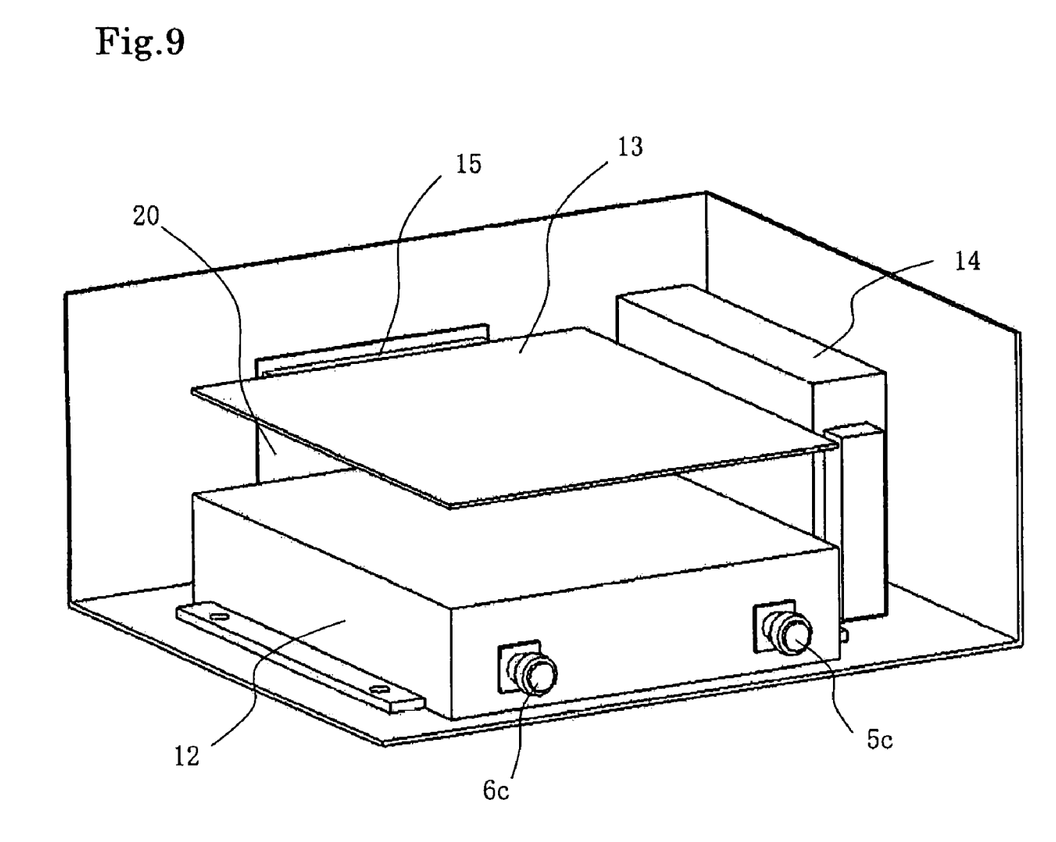
FIG. 9 is a perspective view showing Embodiment 4, i.e., an essential portion of the intruder detection device.

Here, Embodiment 1 has been described on the case, in which the one hundred and fifty reference spectrum diffusion signal generating means 9-1 to 9-150 and correlating means 10-1 to 10-150 are individually mounted to match the interval of the measurement distance of 10 m (±5 m) so that the detection range of 1,500 m and the detection precision of ±5 m can be realized by the single economically excellent intruder detection device of the wide range. In case the intruder detection device has already been shipped to the customer and is running and in case specifications are added for the conveniences (e.g., the increase in the detection range or the improvement in the detecting speed) of the customer, the intruder detection device has to be replaced by a device having only the sensor card 13 modified. By providing a back plane 20 having the right angle type connector 15 of an impedance of 50 so that the sensor card 13 may be easily extracted/inserted from the outside, as shown in FIG. 9, it is possible to change the specifications of the device installed and to improve the maintainability.

Embodiment 5

Figure 10:
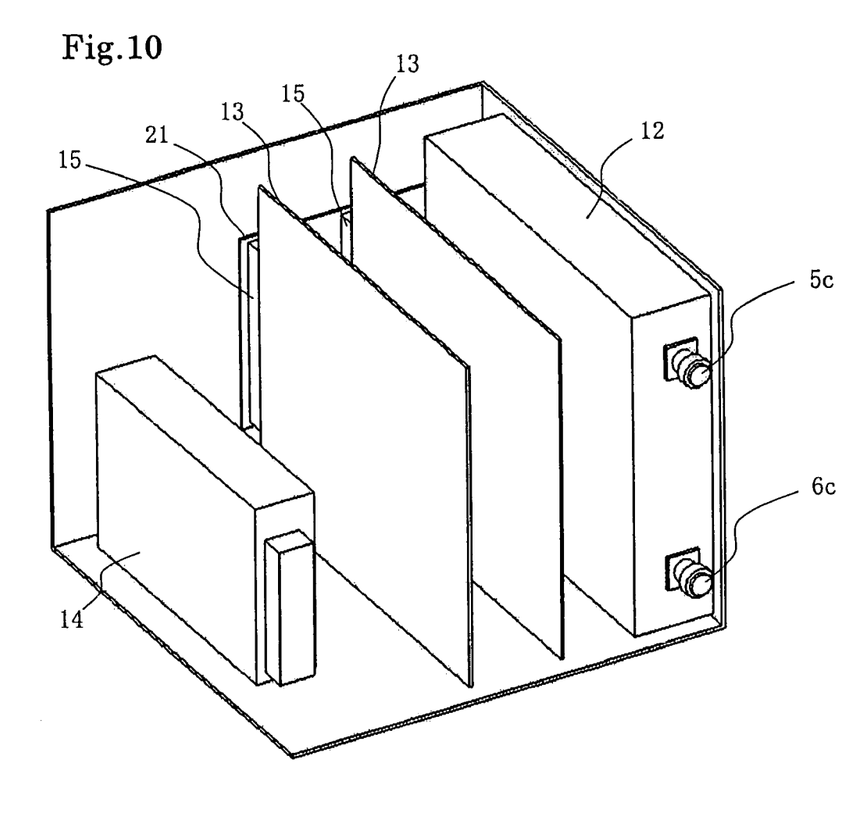
FIG. 10 is a perspective view showing Embodiment 5, i.e., an essential portion of the intruder detection device.
Figure 11:
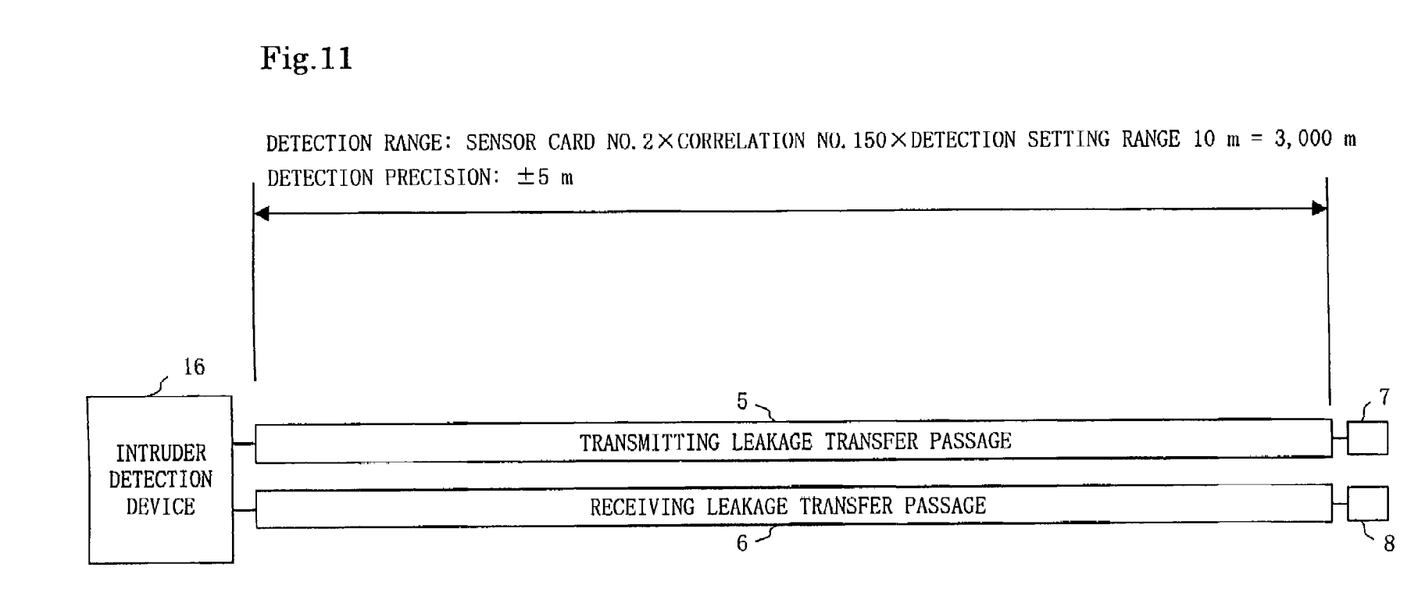
FIG. 11 is a diagram showing Embodiment 5 of this invention, i.e., an example of the installation for commercialization.

Here, Embodiment 1 has been described on the case, in which the one hundred and fifty reference spectrum diffusion signal generating means 9-1 to 9-150 and correlating means 10-1 to 10-150 are individually mounted to match the interval of the measurement distance of 10 m (±5 m) so that the detection range of 1,500 m and the detection precision of ±5 m can be realized by the single economically excellent intruder detection device of the wide range. In case the customer needs coverage of a wide range of 3,000 m around a factory, as shown in FIG. 10, a back plane 21 is provided to have two connectors 15 of an impedance of 50 Ω for connecting the sensor card 13, and two sensor cards 13 are disposed sideway of the RF module 12. As shown in FIG. 11, the detection range can be widened to 2 sensor cards × the correlation number 150× the detection range 10 m (±5 m)=3,000 m by the single intruder detection device while keeping the detection precision of ±5 m. In order to improve the reliability of the device itself, moreover, the error detection percentage can be reduced in a duplex form by the two sensor cards 13 with the specifications remaining at the detection range of 1,500 m and the detection precision of ±5 m, and the two sensor cards 13 are detected at all times so that the decision is made by the majority logic. With the back plane arrangement, as described in Embodiment 4, the maintainability can also be improved by performing the online replacement in the event of failure.

Embodiment 6

Figure 12:
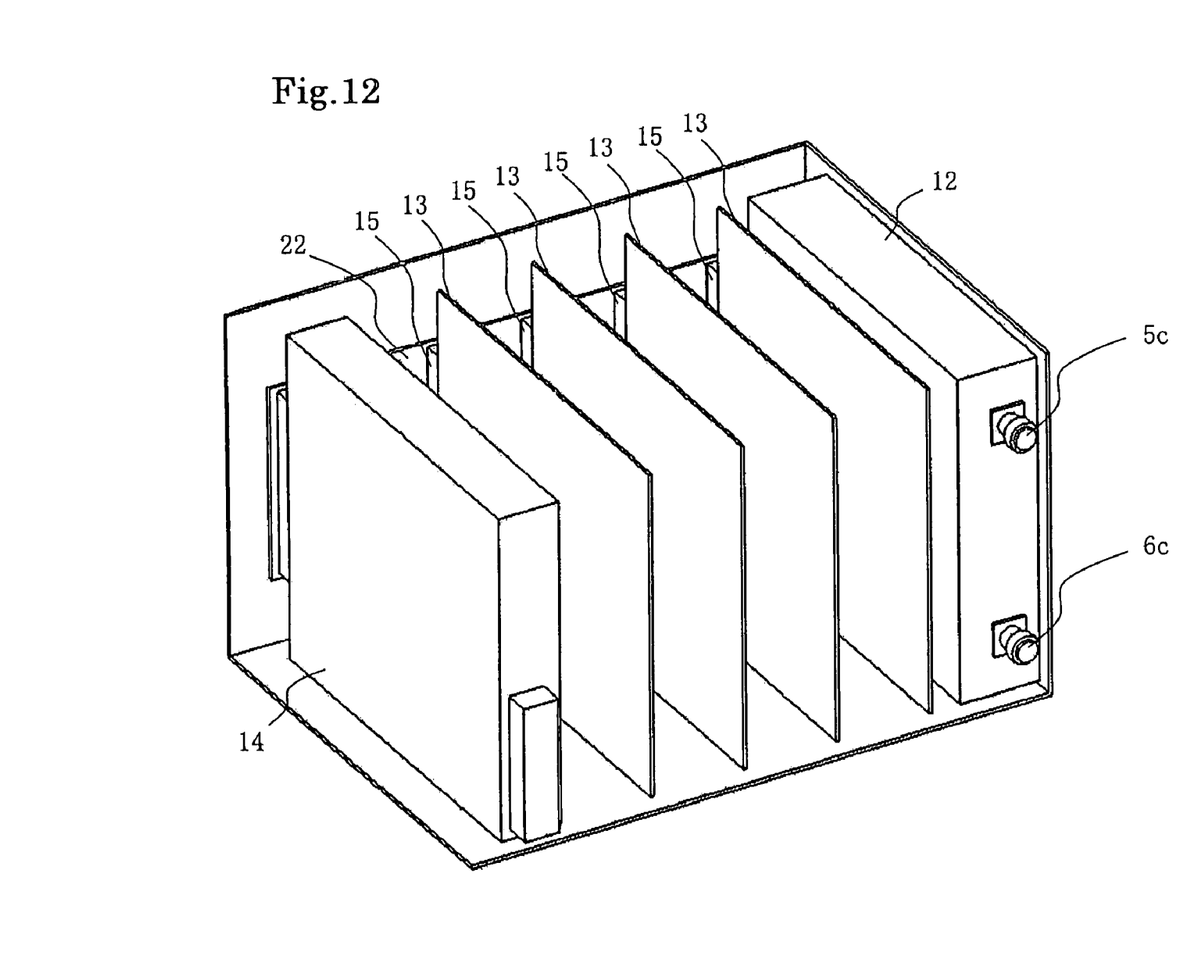
FIG. 12 is a perspective view showing Embodiment 6, i.e., an essential portion of the intruder detection device.
Figure 13:
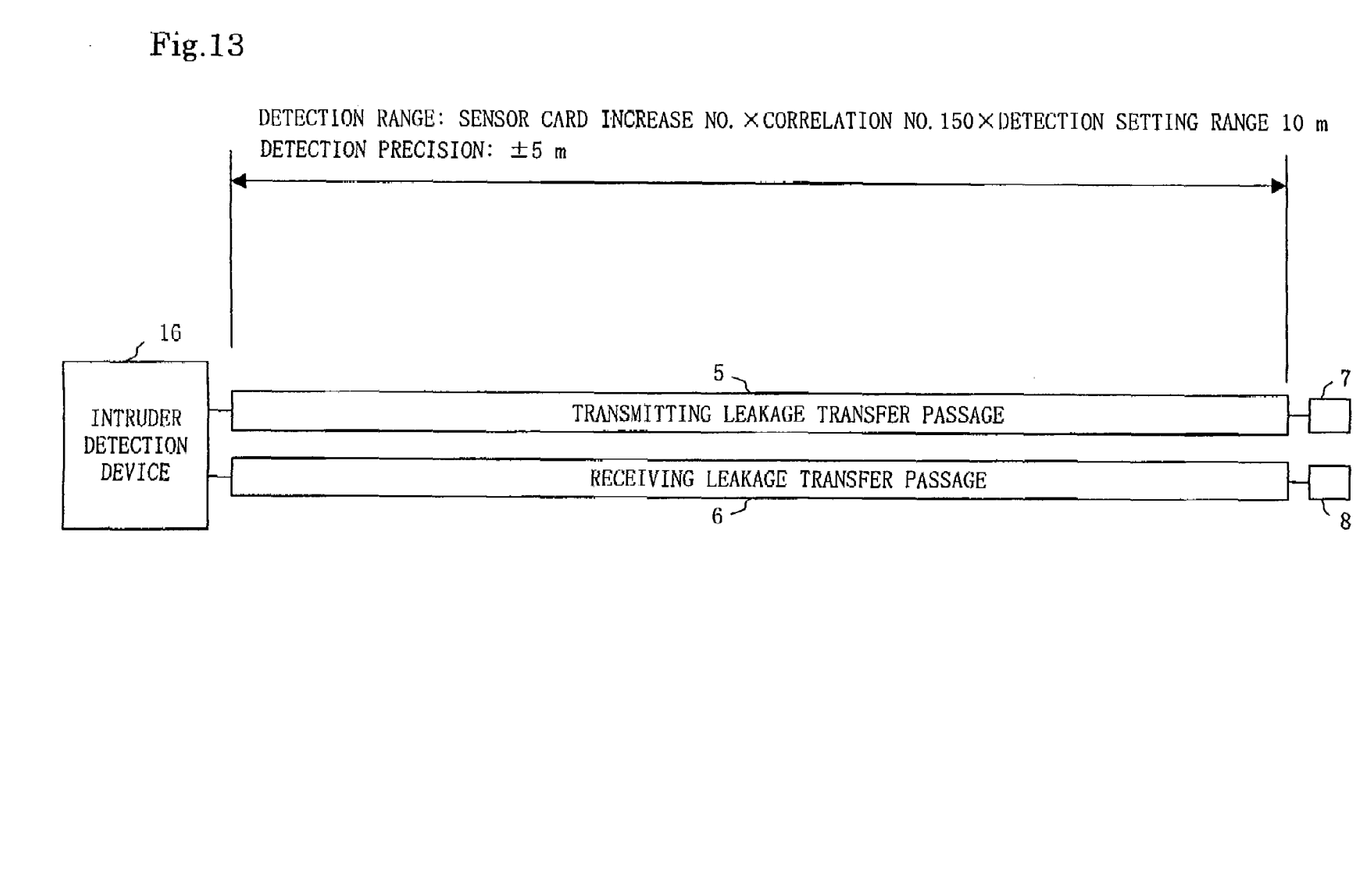
FIG. 13 is a diagram showing Embodiment 6 of this invention, i.e., an example of the installation for commercialization.

Here, Embodiment 1 has been described on the case, in which the one hundred and fifty reference spectrum diffusion signal generating means 9-1 to 9-150 and correlating means 10-1 to 10-150 are individually mounted to match the interval of the measurement distance of 10 m (±5 m) so that the detection range of 1,500 m and the detection precision of ±5 m can be realized by the single economically excellent intruder detection device of the wide range. The customer may need monitoring exceeding 100 Km such as a guards of petroleum pipelines or borders, and the input specifications of the power source may be different for the place of installation. The power source may be required duplex by the installation environment because of a poor reliability of the power source. Such is the case, the detection range can be widened to the sensor card increase number × the correlation number 150× the detection range 10 m (±5 m) by the single intruder detection device while keeping the detection precision of ±5 m, as shown in FIG. 13, by providing a backplane 22 on which the connectors 15 of an impedance of 50 Ω for connecting the sensor cards 13 are arranged as many as possible, installing the sensor cards 13 on the side of the RF module 12 as many as possible, and connecting the power source 14 to the backplane 22, as shown in FIG. 12. Moreover, the product constitution can be expediently made by making the power source duplex or by incorporating power sources of different kinds (e.g., an input type of AC 100 V and an input type of DC 110 V) as a module.

What is claimed is:

1. An intruder detection device for deciding the occurrence of an invasion if an electric wave, which is received by a leakage transfer conduit on a receiving side juxtaposed to a leakage transfer conduit on a transmitting side for receiving a leakage electric wave from said transmitting leakage transfer conduit, changes indicative of an intruder, comprising:

said transmitting side leakage transfer conduit comprising a plurality of leakage slots along the conduit, and opposing corresponding slots along the juxtaposed receiving side leakage transfer conduit, a module having a transmission unit generating a spectrum diffusion signal for outputting a modulated carrier wave to said transmitting leakage transfer passage and being covered with a casing, a sensor card having a plurality of reference spectrum diffusion signal generating means providing respective output corresponding to respective references signals indicative of intruder invasion positions, a plurality of correlating means, for collating an output reference spectrum diffusion signal of said plurality of reference spectrum diffusion signal generating means with the received signal from the receiving leakage transfer passage, and setting means for adjusting a detection precision which is determined by said plurality of reference spectrum diffusion signal generating means and said plurality of correlating means, whereby an invasion position of an intruder is detected from the individual outputs of said plurality of correlating means, and a power source device provided individually for said module and said sensor card;

wherein said sensor card is juxtaposed to said module.

2. An intruder detection device according to claim 1, wherein said setting means has functions to stop the functions of said individual reference spectrum diffusion signal generating means individually and to stop the functions of said individual correlating means individually.

3. An intruder detection device according to claim 1, wherein said setting means has a function to individually change the delay times to be set in said individual reference spectrum diffusion signal generating means.

4. An intruder detection device according to claim 1, wherein an intruder detection range is increased/decreased by increasing/decreasing the installed number of said sensor cards.

5. An intruder detection device according to claim 1, wherein:

said transmission unit is connected together with said sensor card in their individual longitudinal directions for transmitting the spectrum diffusion signal; and said power source device is provided individually for said transmission unit and said sensor card and arranged close to said sensor card.

6. An intruder detection device according to claim 1,:
wherein said transmission unit is connected together with said sensor card in juxtaposition to directions intersecting with their individual longitudinal directions, for transmitting the spectrum diffusion signal.

7. An intruder detection device according to claim 6, wherein said transmission unit for transmitting the spectrum diffusion signal and said sensor card are vertically arranged such that said transmission unit faces downward.

8. An intruder detection device according to claim 6, wherein said transmission unit for transmitting the spectrum diffusion signal and said sensor card are arranged such that they are transversely juxtaposed to each other.

9. An intruder detection device according to claim 1, wherein:
the transmission unit is connected together with said sensor card in juxtaposition to a direction intersecting their individual longitudinal directions for transmitting the spectrum diffusion signal; and
the power source device is provided individually for said transmission unit and said sensor card and arranged such that said sensor card is positioned between said power source device and said transmission unit.

10. An intruder detection device according to claim 1, wherein said reference spectrum diffusion signal generating means and said correlating means are provided in an equal number, and wherein said individual spectrum diffusion signal generating means and said individual correlating means are connected one-to-one.

11. An intruder detection device according to claim 1, wherein the intruder detecting range is determined by the product of the unit measurement distance and the number of said reference spectrum diffusion signal generating means.

12. An intruder detection device according to claim 1, wherein said sensor card is made to mount one hundred and fifty of said reference spectrum diffusion signal generating means aid said correlating means corresponding to the measurement distance of 10 m (±5 m from the leakage portion) necessary for the invasion detecting means, whereby said intruder detection device has a detecting function of a detection range of 1,500 m and a detection precision of ±5 m.

13. An intruder detection device according to claim 1, wherein said sensor card is made to mount one hundred and fifty of said reference spectrum diffusion signal generating means aid said correlating means corresponding to the measurement distance of 2.5 m (±1.25 m from the leakage portion) necessary for the invasion detecting means, whereby said intruder detection device has a detecting function of a detection range of 375 m and a detection precision of ±1.25 m.

14. An intruder detection device according to claim 1, wherein said sensor card is made to mount one hundred and fifty of said reference spectrum diffusion signal generating means aid said correlating means corresponding to the measurement distance of 10 m (± m from the leakage portion) necessary for the invasion detecting means, and wherein said sensor card is mounted by two sheets, whereby said intruder detection device has a detecting function of a detection range of 3,000 m and a detection precision of ±5 m.

* * * * *